United States Patent [19]

Nakamura et al.

[11] Patent Number: 4,640,252

[45] Date of Patent: Feb. 3, 1987

[54] FUEL INJECTION SYSTEM FOR DIESEL ENGINE

[75] Inventors: Saburo Nakamura; Tsutomu Matsuoka; Hirofumi Yamauchi; Masanori Sahara, all of Hiroshima, Japan

[73] Assignee: Mazda Motor Corporation, Hiroshima, Japan

[21] Appl. No.: 694,960

[22] Filed: Jan. 25, 1985

[30] Foreign Application Priority Data

| Jan. 28, 1984 | [JP] | Japan | 59-14130 |
| Feb. 1, 1984 | [JP] | Japan | 59-17874 |
| Feb. 1, 1984 | [JP] | Japan | 59-17875 |
| Feb. 8, 1984 | [JP] | Japan | 59-22446 |

[51] Int. Cl.$^4$ .................................. F02M 39/00
[52] U.S. Cl. ........................... 123/446; 123/496; 123/467; 123/502
[58] Field of Search ............... 123/446, 502, 467, 496

[56] References Cited

U.S. PATENT DOCUMENTS

| 4,077,376 | 3/1978 | Thoma | 123/467 |
| 4,284,049 | 8/1981 | Chmeca | 123/467 |
| 4,333,436 | 6/1982 | Kopse | 123/467 |
| 4,407,250 | 10/1983 | Eheim | 123/467 |
| 4,437,443 | 3/1984 | Hofbauek | 123/467 |
| 4,440,133 | 4/1984 | Jourde | 123/446 |
| 4,440,135 | 4/1984 | Asami | 123/446 |
| 4,528,951 | 7/1985 | Yamada | 123/446 |

Primary Examiner—Ronald B. Cox
Attorney, Agent, or Firm—Gerald J. Ferguson, Jr.; Michael P. Hoffman; Ronni S. Malamud

[57] ABSTRACT

The fuel injection system for a diesel engine comprises a pintle type fuel injection nozzle having a valve needle slidable back and forth in the axial direction thereof between a first position in which its front end portion is inserted in a spray hole and a second position in which its front end portion is retracted from the spray hole, fuel supply means for feeding pressurized fuel to the fuel injection nozzle, and a plunger member which is slidable in the axial direction of the valve needle and provided with a front end face opposed to the rear end face of the valve needle and a rear end face adapted to receive the pressure of the pressurized fuel fed to the fuel injection nozzle from the fuel supply means, the valve needle being adapted to be lifted by a predetermined fuel pressure to a pre-lift position where the rear end face of the valve needle abuts against the front end face of the plunger member so that further lift of the valve needle is suppressed by the fuel pressure acting on the rear end face of the plunger member, thereby changing the valve opening pressure stepwise with change in the amount of lift of the valve. The injection system is provided with pre-lift change means for changing the amount of the pre-lift of the valve needle, an operating condition detecting means for detecting the operating condition of the engine, and a control means for controlling the pre-lift change means according to the output of the operating condition detecting means.

18 Claims, 19 Drawing Figures

FUEL INJECTION SYSTEM FOR DIESEL ENGINE

BACKGROUND OF THE INVENTION

1. Field of the Invention

This invention relates to a fuel injection system for a diesel engine, and more particularly to a fuel injection system for a diesel engine having a pintle fuel injection nozzle which has a valve needle lifted by the fuel pressure and in which the effective area of the spray hole or the spray area is changed according to the lift of the valve needle. In this specification, the term "pintle fuel injection nozzle" should be broadly interpreted to include throttle type nozzles in which the so-called "throttle range" in which the valve needle throttles the spray hole extends over a relatively large part of the lift of the valve needle.

2. Description of the Prior Art

As one type of pintle fuel injection nozzle, there has been known a central plunger type pintle fuel injection nozzle as disclosed in Japanese Unexamined Patent Publication No. 57(1982)-151058. In the central plunger type pintle fuel injection nozzle disclosed in this Patent Publication, a plunger member is provided behind a valve needle to be slidable coaxially with the valve needle, and the valve opening pressure at a predetermined lift of the valve needle (pre-lift) is increased stepwise by imparting a predetermined pressure to the plunger member, thereby suppressing lift of the valve needle and controlling the injecting pressure and the like to improve combustion in the combustion chamber.

In the central plunger type pintle fuel injection nozzle, the plunger member is spaced away from the valve needle by a distance corresponding to the amount of the prelift, and the valve needle is lifted by a relatively small valve opening pressure which may be of a small value such that it can just overcome the force of a spring until the valve needle is lifted to abut against the plunger member, while after the valve needle abuts against the plunger member, further lift of the valve needle is resisted by the fuel pressure imparted to the plunger member and the valve needle cannot be further lifted until the valve opening pressure is increased to overcome the sum of the fuel pressure imparted to the plunger member and the force of the spring.

By combining the central plunger type fuel injection nozzle with a pintle nozzle having a throttle range in which the front end portion of the valve needle is moved into and away from the spray hole, atomization of sprayed fuel can be promoted and the fuel injection rate (the amount of fuel injected per unit crank angle) can be controlled by extending the time the lift of the valve needle is in the throttle range, and self-control of the lift of the valve needle by the fuel pressure can be obtained.

The arrangement of self-control of the valve needle lift is advantageous in that fluctuation in the effective area of the spray hole from cylinder to cylinder due to deposition of carbon or variation in the machined dimensions of the spray holes, for instance, can be compensated for by setting the pre-lift at the boundary between the throttle range and the lift change range in which the lift of the valve needle changes with fuel pressure or in the lift change range so that the amount of lift of the valve needle (the area released) is self-controlled according to the fuel pressure. For example, in a cylinder with a spray hole which is narrower than that of the other cylinders, the injection amount is apt to become less and/or the injecting time is apt to become longer. However, in the self-control arrangement, such reduction of the injection amount and/or such extension of the injecting time can be prevented since when the spray area is narrower, the fuel pressure becomes higher whereby the amount of lift is increased to increase the injection amount and to shorten the injecting time.

However, the conventional central plunger type pintle fuel injection nozzle has a drawback in that because the amount of the pre-lift solely depends upon the fuel pressure, it can be matched to only a particular operating condition of the engine, and cannot properly use functions for atomization of fuel and/or for changing the fuel injection amount according to various operating conditions of the engine. Thus, in the conventional central plunger type pintle fuel injection nozzle, it is difficult to control the lift of the valve needle in order to obtain improved combustion in the combustion chamber and to improve the engine output power according to the operating condition over a wide operating range of the engine.

SUMMARY OF THE INVENTION

In view of the foregoing observations and description, the primary object of the present invention is to provide an improved fuel injection system for a diesel engine which can be matched to various operating conditions of the engine.

Another object of the present invention is to provide an improved fuel injection system for a diesel engine in which functions for atomization of fuel and for changing the fuel injection amount can be properly used according to the operating condition of the engine.

Still another object of the present invention is to provide an improved fuel injection system for a diesel engine which can accomplish the above objects without substantially complicating the structure or the control process.

The fuel injection system for a diesel engine in accordance with the present invention comprises a pintle type fuel injection nozzle having a valve needle slidable back and forth in the axial direction thereof between a first position in which its front end portion is inserted in a spray hole and a second position in which its front end portion is retracted from the spray hole, fuel supply means for feeding pressurized fuel to the fuel injection nozzle, and a plunger member which is slidable in the axial direction of the valve needle and provided with a front end face opposed to the rear end face of the valve needle and a rear end face adapted to receive the pressure of the pressurized fuel fed to the fuel injection nozzle from the fuel supply means, the valve needle being adapted to be lifted by a predetermined fuel pressure to a pre-lift position where the rear end face of the valve needle abuts against the front end face of the plunger member so that further lift of the valve needle is suppressed by the fuel pressure acting on the rear end face of the plunger member, thereby changing the valve opening pressure stepwise with change in the amount of lift of the valve wherein the improvement comprises pre-lift change means for changing the amount of the pre-lift of the valve needle, an operating condition detecting means for detecting the operating condition of the engine, and a control means for controlling the pre-lift change means according to the output of the operating condition detecting means.

In one preferred embodiment of the present invention, said valve needle and the central plunger member are slidably received in a cylinder formed in a valve body, and said pre-lift change means comprises a plurality of fuel drain passages provided in the cylinder wall spaced from each other in the axial direction of the cylinder or in the direction of movement of the valve needle, and switching valve means for selectively opening and closing the fuel drain passages, each fuel drain passage being adapted to discharge leakage fuel between the valve needle and the central plunger member.

DESCRIPTION OF THE PREFERRED EMBODIMENT

Figure 1:
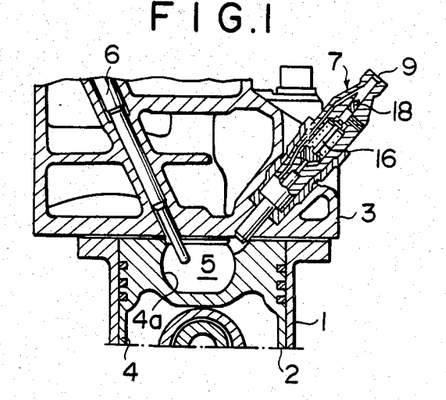
FIG. 1 is a fragmentary cross-sectional view of a combustion chamber portion of a direct injection type diesel engine employing a fuel injection system in accordance with a first embodiment of the present invention.

In FIG. 1 which shows a combustion chamber portion of a direct injection type diesel engine having a fuel injection system in accordance with a first embodiment of the present invention, reference numeral 2 denotes a cylinder formed in a cylinder block 1. A cylinder head 3 is mounted on the top of the cylinder block 1 and a piston 4 is fitted into the cylinder 2 for reciprocation. The piston 4 is provided at the top surface thereof with a cavity 4a for forming a combustion chamber 5.

Though not shown, an intake port and an exhaust port are formed in the cylinder head 3 to be communicated with the combustion chamber 5. The intake port is shaped and positioned so that an air swirl is produced in the combustion chamber 5 during the intake stroke.

A glow pin plug 6 for assisting cold starting and a pintle fuel injection nozzle 7 is mounted in the cylinder head 3. The fuel injection nozzle 7 is directed to spray fuel in the direction of the air swirl produced in the combustion chamber 5.

Figures 2, 3:
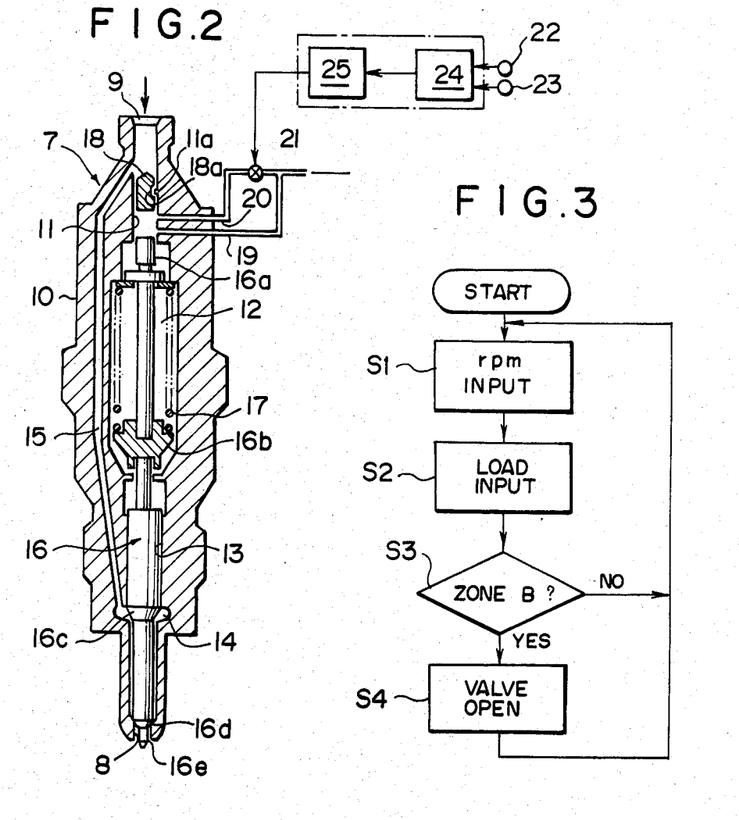
FIG. 2 is an enlarged cross-sectional view of a pintle nozzle employed in the fuel injection system of the first embodiment.
FIG. 3 is a flow chart for illustrating the operation of the control circuit of the fuel injection system of the first embodiment.
Figure 4:
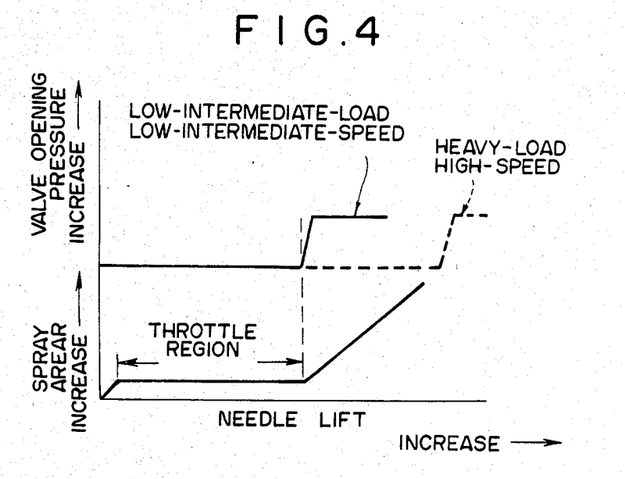
FIG. 4 is a view showing relations between the valve needle lift and the valve opening pressure, and between the valve needle lift and the spray area in the fuel injection system of the first embodiment.

As shown in FIG. 2, the pintle fuel injection nozzle 7 comprises a nozzle body 10 in which a fuel inlet 9, a cylinder 11, a spring chamber 12, a valve needle retaining hole 13, a fuel pressure chamber 14, and a fuel spray hole 8 are coaxially formed in this order from the rear end (the upper end in FIG. 2) to the front end to communicate with each other. The fuel spray hole 8 opens in the combustion chamber 5 and the fuel inlet 9 is connected to a fuel injection pump (not shown). The nozzle body 10 is further provided with a fuel passage 15 by way of which the fuel inlet 9 and the fuel pressure chamber 14 (fuel spray hole 8) directly communicate with each other. In the hollow portion from the cylinder 11 to the fuel spray hole 8 is inserted a valve needle 16 slidably retained by the valve needle retaining hole 13 in the liquid-tight fashion. The valve needle 16 comprises a piston portion 16a inserted into the front end portion of the cylinder 11, a spring retaining portion 16b disposed in the spring chamber 12, a pressure portion 16c which receives the fuel pressure in the fuel pressure chamber 14, a valve portion 16d for opening and closing the spray hole 8 and a throttle portion 16e inserted into the spray hole 8 spaced from the wall surface thereof by a predetermined distance. In the spring chamber 12 is disposed a nozzle spring 17 for urging the valve needle 16 in the valve closure direction. When pressurized fuel from the fuel injection pump is introduced into the fuel pressure chamber 14 through the fuel inlet 9 and the fuel passage 15, the valve needle 16 is opened or lifted overcoming the force of the spring 17 by the pressure imparted to the pressure portion 16c thereof and thereby the pressurized fuel is sprayed into the combustion chamber 5 through the spray hole 8. As the lift of the valve needle 16 increases, the opening area of the spray hole 8 or the effective spray area changes as shown in the lower portion of FIG. 4. That is, at smaller lifts of the valve needle 16 before the throttle portion 16e leaves the spray hole 8, the effective spray area is held substantially constant (referred to as "throttle range") and after the throttle portion 16e is moved away from the spray hole 8, the effective spray area is increased in proportion to the lift of the valve needle 16 (referred to as "proportional change range"), and thereafter the lift of the valve needle 16 reaches maximum.

A plunger member 18 is received in the rear portion of the cylinder 11 for limited sliding movement, with an engaging groove 18a formed in the peripheral surface thereof being engaged with a projection 11a formed on the wall surface defining the cylinder 11. That is, the plunger member 18 is slidably disposed behind the valve needle 16 coaxially therewith, the front end of the plunger member 18 opposed to the piston portion 16a or the rear end portion of the valve needle 16 and the rear end surface of the plunger member 18 being adapted to receive the fuel pressure from the fuel inlet 9.

First and second drain passages 19 and 20 open in the cylinder 11 between the rear end of the valve needle 16 and the plunger member 18 at positions spaced from each other in the axial direction of the cylinder 11 by a predetermined distance. Through the drain passages 19 and 20, leakage fuel leaking in the cylinder 11 and the spring chamber 12 from the fuel pressure chamber 14 through the fine space between the valve needle 16 and the wall surface defining the valve needle retaining hole 13 is discharged to fuel reservoir (not shown). The first drain passage 19 is positioned to be closed by the piston portion 16a of the valve needle 16 while the lift of the valve needle 16 is in the throttle range in which the spray area is narrowed by the throttle portion 16c of the valve needle 16. On the other hand, the second drain passage 20 is positioned not to be closed by the piston portion 16a even when the valve needle 16 is lifted to the maximum. The second drain passage 20 is connected to said fuel reservoir by way of a normally closed solenoid valve 21 and the first drain passage 19 is directly connected to the reservoir. The purpose of the solenoid valve 21 will become apparent later. The solenoid valve 21 is normally closed and is opened under the control of a control device 26.

The control device 26 comprises a valve driving circuit 25 for driving the solenoid valve 21 and a control circuit 24 which receives the outputs of an engine speed sensor 22 and an engine load sensor 23 and controls the valve driving circuit 25 according to the operating condition of the engine. That is, at low to intermediate speed and light to intermediate load, the solenoid valve 21 is kept closed so that the leakage fuel is discharged only through the first drain passage 19, and at high speed and heavy load, the solenoid valve 21 is opened so that the leakage fuel is discharged through both the first and second drain passages 19 and 20.

When pressurized fuel is supplied to the fuel injection nozzle 7, the pressurized fuel is introduced into the fuel pressure chamber 14 through the fuel inlet 9 via the fuel passage 15, and pushes the pressure portion 16c of the valve needle 16 to lift the valve needle 16 against the force of the nozzle spring 17, whereby the fuel is sprayed into the combustion chamber 5 through the spray hole 8.

The pressure of the pressurized fuel at the fuel inlet 9 acts on the rear end surface of the plunger member 18 in the cylinder 11 to push the plunger member 18 toward the valve needle 16. The fuel pressure acting on the plunger member 18 controls the lift of the valve needle 16. That is, as shown in FIG. 3, the control circuit 24 receives an engine speed signal from the engine speed sensor 22 (step 1) and an engine load signal from the engine load sensor 23 (step 2), and determines whether or not the operating region of the engine is in the high speed, heavy load region (corresponding to zone B in FIG. 5) (step 3). When it is not determined that the operating region is in the high speed, heavy load region or, in other words, it is determined that the operating region of the engine is in the low-to-intermediate-speed, light-to-intermediate-load region corresponding to zone A in FIG. 5, the solenoid valve 21 is kept closed, and accordingly the valve needle 16 is lifted by the fuel pressure imparted to the pressure portion 16c thereof overcoming only the force of the nozzle spring 17 with leakage fuel in the cylinder 11 being discharged through the first drain passage 19 until the valve needle 16 is lifted to such an extent that the piston portion 16a of the valve needle 16 closes the first drain passage 19, and after the first drain passage 19 is closed, the leakage fuel is confined in the cylinder 11 between the piston portion 16a of the valve needle 16 and the plunger member 18, whereby the fuel pressure acting on the rear surface of the plunger member 18 is transmitted to the valve needle 16 to resist lift of the valve needle 16, i.e., the opening pressure of the same is increased. This effect is obtained while the lift of the valve needle 16 is in the throttle range as shown by the solid line in the upper portion of FIG. 4 because the first drain passage 19 is positioned to be closed by the piston portion 16a of the valve needle 16 when the lift of the same is in the throttle range as described above. By thus limiting lift of the valve needle 16 to within the throttle range, the condition in which fuel is injected from the spray hole 8 at high velocity is maintained for a long time, thereby promoting atomization of the fuel to improve combustion and emission.

Figure 5:
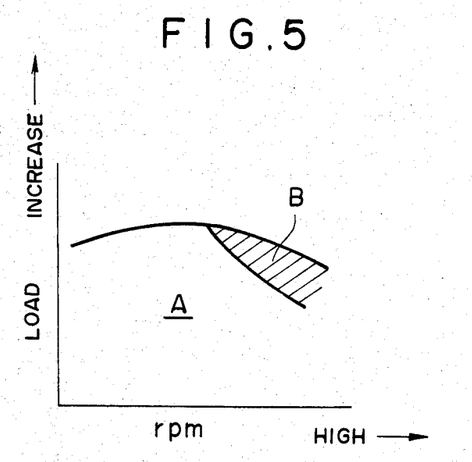
FIG. 5 is a view for illustrating the operating regions based on which the fuel injection system of the first embodiment is controlled.

On the other hand, when it is determined in the step 3 that the operating region is in the high speed, heavy load region corresponding to zone B in FIG. 5, the control circuit 24 outputs a valve driving signal to open the solenoid valve 21 (step 4). When the solenoid valve 21 is opened, the valve needle 16 is lifted discharging the leakage fuel in the cylinder 11 through both the first and second drain passages 19 and 20 until the piston portion 16a thereof closes the first drain passage 19, and thereafter the valve needle 16 is lifted discharging the leakage fuel through only the second drain passage 20. Because the second drain passage 20 is positioned not to be closed even when the valve needle 16 is lifted to the maximum as described above, the valve needle 16 is lifted to the maximum without being resisted by the plunger member 18 as shown by the dotted line in the upper part of FIG. 4 as in conventional pintle type fuel injection nozzles, whereby a sufficient amount of fuel can be sprayed into the combustion chamber and the engine output power can be improved.

Figures 6, 8:
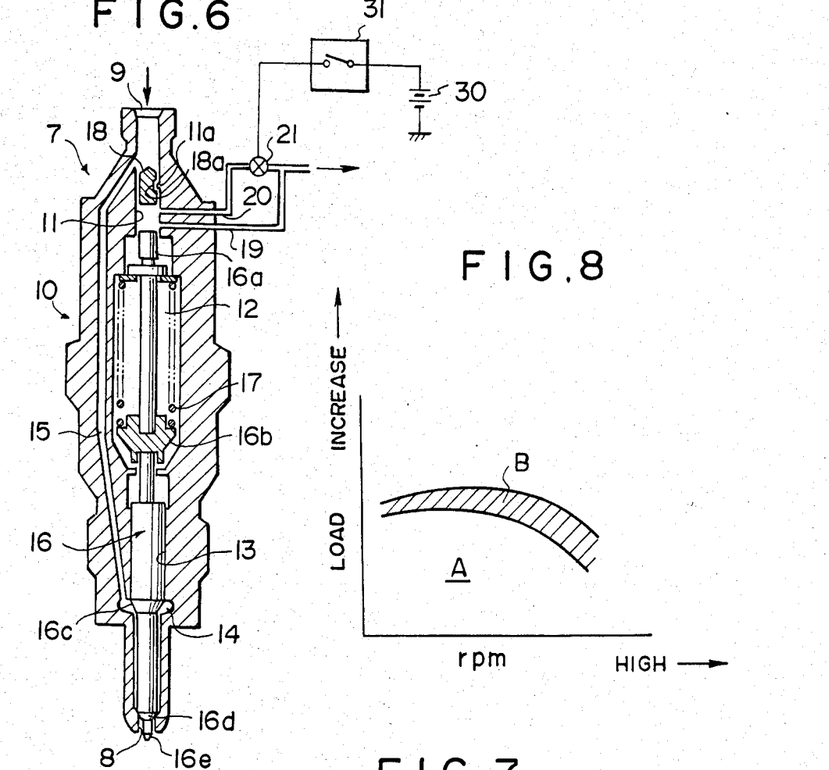
FIG. 6 is an enlarged cross-sectional view of a pintle nozzle employed in a fuel injection system in accordance with a second embodiment of the present invention.
FIG. 8 is a view for illustrating the operating regions of the engine based on which the fuel injection system of the second embodiment is controlled.
Figure 7:
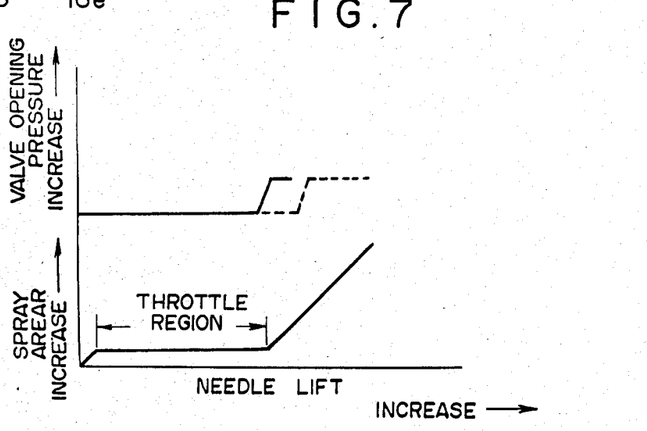
FIG. 7 is a view showing the relations between the valve needle lift and the valve opening pressure, and between the valve needle lift and the spray area in the fuel injection system of the second embodiment.

FIG. 6 shows a part of a fuel injection system in accordance with a second embodiment of the present invention. The fuel injection system of this embodiment is basically the same as that of the first embodiment except that the control of the solenoid valve 21 differs from that in the first embodiment. In this embodiment, the solenoid valve 21 for selectively opening and closing the second drain passage 20 is controlled according only to the load on the engine. That is, the solenoid valve 21 is connected to a power source 30 by way of a load switch 31 which is opened when the operating region of the engine is in a light load region corresponding to zone A in FIG. 8 and is closed to close the second drain passage 21 when the operating region of the engine is in a heavy load region corresponding to zone B in FIG. 8, e.g., when the load on the engine exceeds 75% of the maximum load. Further, in this embodiment, as the lift of the valve needle 16 increases, the opening area of the spray hole 8 or the effective spray area changes as shown in the lower portion of FIG. 7. The behavior of the valve needle 21 with respect to opening and closure of the second drain passage 20 is identical to that in the first embodiment. Though in the first embodiment, the second drain passage 20 is positioned not to be closed even when the valve needle 16 is lifted to the maximum, in the second embodiment, the second drain passage 20 is positioned to be closed by the piston portion 16a of the valve needle 16 when the lift of the valve needle 16 is in the proportional change range in which the effective spray area is increased in proportion to the lift of the valve needle 16.

When it is determined that the operating region of the engine is in the light load region corresponding to zone A in FIG. 8, the solenoid valve 21 is kept closed, and accordingly the valve needle 16 is lifted by the fuel pressure imparted to the pressure portion 16c thereof overcoming only the force of the nozzle spring 17 with leakage fuel in the cylinder 11 being discharged through the first drain passage 19 until the valve needle 16 is lifted to such an extent that the piston portion 16a of the valve needle 16 closes the first drain passage 19, and after the first drain passage 19 is closed, the leakage fuel is confined in the cylinder 11 between the piston portion 16a of the valve needle 16 and the plunger member 18, whereby the fuel pressure acting on the rear surface of the plunger member 18 is transmitted to the valve needle 16 to resist lift of the valve needle 16, i.e., the opening pressure of the same is increased. This effect is obtained while the lift of the valve needle 16 is in the throttle range as shown by the solid line in upper portion of FIG. 7 because the first drain passage 19 is positioned to be closed by the piston portion 16a of the valve needle 16 when the lift of the same is in the throttle range as described above. By thus limiting lift of the valve needle 16 to within the throttle range, the condition in which fuel is injected from the spray hole 8 at high velocity is maintained for a long time, thereby promoting atomization of the fuel to improve combustion and emission.

On the other hand, when it is determined that the operating region is in the heavy load region corresponding to zone B in FIG. 8, the load switch 31 is closed to open the solenoid valve 21. When the solenoid valve 21 is opened, the valve needle 16 is lifted discharging the leakage fuel in the cylinder 11 through both the first and second drain passages 19 and 20 until the piston portion 16a thereof closes the first drain passage 19, and thereafter the valve needle 16 is lifted discharging the leakage fuel through only the second drain passage 20. Because the second drain passage 20 is positioned to be closed when the valve needle 16 is lifted to the proportional change range between the throttle range and the maximum lift as described above, the valve opening pressure is increased in the proportional change range as shown by the dotted line in the upper part of FIG. 4, whereby a sufficient amount of fuel can be sprayed into the combustion chamber and the engine output power at heavy load can be improved.

Figure 9:
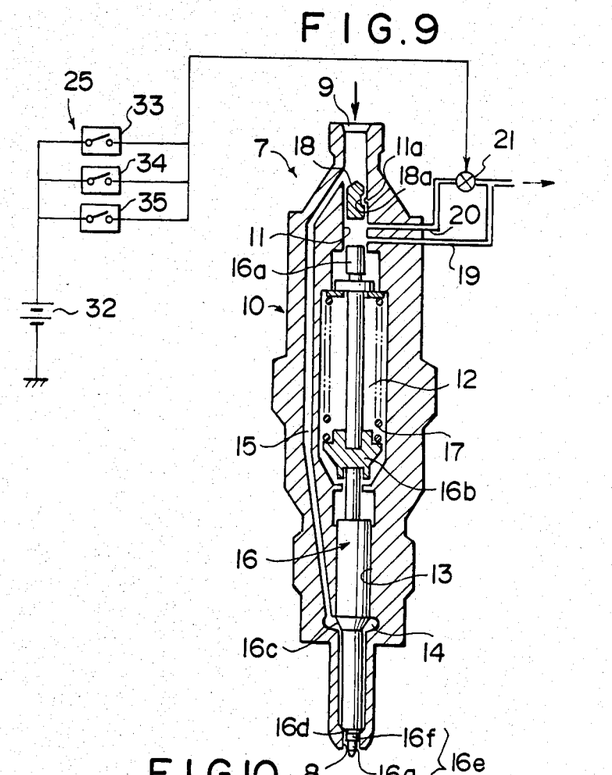
FIG. 9 is an enlarged cross-sectional view of a pintle nozzle employed in a fuel injection system in accordance with a third embodiment of the present invention.
Figure 10:
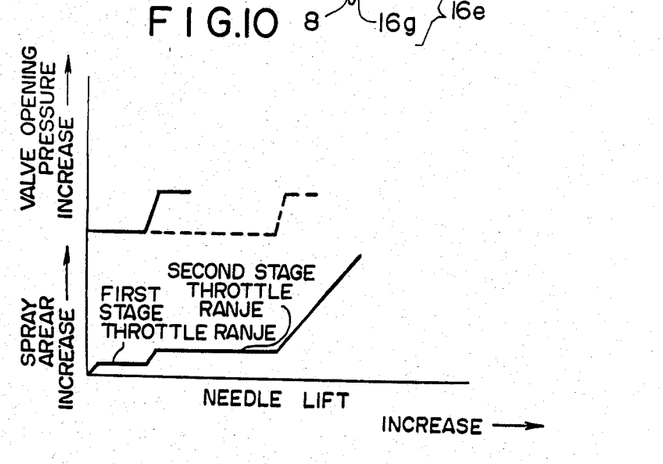
FIG. 10 is view showing the relations between the valve needle lift and the valve opening pressure, and between the valve needle lift and the spray area in the fuel injection system of the third embodiment.

FIG. 9 shows a part of a fuel injection system in accordance with a third embodiment of the present invention. The fuel injection system of this embodiment is basically the same as that of the first embodiment except that the control of the solenoid valve 21 differs from that in the first embodiment. In this embodiment, the solenoid valve 21 for selectively opening and closing the second drain passage 20 is controlled according to the engine coolant temperature, the ambient temperature and the atmospheric pressure. That is, the solenoid valve 21 is normally opened and is connected to a power source 32 by way of a coolant temperature switch 33, an ambient temperature switch 34 and an atmospheric pressure switch 35 which are connected between the power source 32 and the solenoid valve 21 in parallel. The coolant temperature switch 33 is closed when the temperature of the engine coolant is not higher than 60° C., for instance, and the ambient temperature switch 34 is closed when the ambient temperature is not higher than 15° C., for instance, and the atmospheric pressure switch 35 is closed when the atmospheric pressure is not higher than 0.9 atm, for instance. Therefore, when the engine coolant temperature is not higher than 60° C., or when the ambient temperature is not higher than 15° C., or when the atmospheric pressure is not higher than 0.9 atm, that is, when the intake-air compression temperature is low, the solenoid valve 21 is energized to close the second drain passage 20. Further, in the third embodiment, the throttle portion 16e of the valve needle 16 comprises a larger diameter throttle portion 16f and a smaller diameter throttle portion 16g which is nearer to the tip of the valve needle 16 than the larger diameter throttle portion 16f. Therefore, in the third embodiment, as the lift of the valve needle 16 is increased, the opening area of the spray hole 8 or the effective spray area changes as shown in the lower portion of FIG. 10. That is, before the larger diameter throttle portion 16f is retracted from the spray hole 8, the effective spray area is defined by the larger diameter throttle portion 16f and is extremely small. The effective spray area is held constant at the extremely small area (referred to as "first stage throttle range") until the larger diameter throttle portion 16f is retracted from the spray hole 8. After the larger diameter throttle portion 16f is retracted from the spray hole 8, the effective spray area is defined by the smaller diameter throttle portion 16g and accordingly is somewhat widened (referred to as "second stage throttle range"). After the larger diameter throttle portion 16f is retracted from the spray hole 8 and before the smaller diameter throttle portion 16g is retracted from the spray hole 8, the effective spray area is held constant at the somewhat widened area. After the smaller diameter throttle portion 16g is retracted away from the spray hole 8, the effective spray area is increased in proportion to the lift of the valve needle 16 (referred to as "proportional change range") and thereafter the lift of the valve needle 16 reaches maximum. In the third embodiment, the first drain passage 19 is positioned to be closed by the piston portion 16a when the lift of the valve needle 16 is in the first stage throttle range, and the second drain passage 20 is positioned to be closed by the piston portion 16a when the lift of the valve needle 16 is in the second stage throttle range.

When the engine coolant temperature is not higher than 60° C., or when the ambient temperature is not higher than 15° C., or when the atmospheric pressure is not higher than 0.9 atm, that is, when the engine is apt to emit white smoke, one among the coolant temperature switch 33, the ambient temperature switch 34 and the atmospheric pressure switch 35 is closed to energize the solenoid valve 21 to close the second drain passage 20. When the second drain passage 20 is closed, the valve needle 16 is lifted by the fuel pressure imparted to the pressure portion 16c thereof overcoming only the force of the nozzle spring 17 with leakage fuel in the cylinder 11 being discharged through the first drain passage 19 until the valve needle 16 is lifted to such an extent that the piston portion 16a of the valve needle 16 closes the first drain passage 19, and after the first drain passage 19 is closed, the leakage fuel is confined in the cylinder 11 between the piston portion 16a of the valve needle 16 and the plunger member 18, whereby the fuel pressure acting on the rear surface of the plunger member 18 is transmitted to the valve needle 16 to resist lift of the valve needle 16, i.e., the opening pressure of the same is increased. This effect is obtained while the lift of the valve needle 16 is in the first stage throttle range as shown by the solid line in the upper portion of FIG. 10 since the first drain passage 19 is positioned to be closed by the piston portion 16a of the valve needle 16 when the lift of the same is in the first stage throttle range as described above. By thus limiting lift of the valve needle 16 to within the first stage throttle range, the condition in which fuel is injected from the spray hole 8 at high velocity is maintained for a long time, thereby promoting atomization of the fuel to improve combustion and emission. Thus, emission of unburnt fuel or white smoke due to HC can be reduced.

When the engine coolant temperature is higher than 60° C., the ambient temperature is higher than 15° C. and the atmospheric pressure is higher than 0.9 atm, the solenoid valve 21 is kept opened, and accordingly the valve needle 16 is lifted by the fuel pressure imparted to the pressure portion 16c thereof overcoming only the force of the nozzle spring 17 and discharging the leakage fuel in the cylinder through both the first and second drain passages 19 and 20 until the valve needle 16 is lifted to such an extent that the piston portion 16a closes the second drain passage 20. After the second drain passage 20 is closed, the leakage fuel is confined in the cylinder 11 between the piston portion 16a of the valve needle 16 and the plunger member 18, whereby the fuel pressure acting on the rear surface of the plunger member 18 is transmitted to the valve needle 16 to resist lift of the valve needle 16, i.e., the opening pressure of the same is increased. This effect is obtained while the lift of the valve needle 16 is in the second stage throttle range as shown by the dotted line in the upper portion of FIG. 10 because the second drain passage is positioned to be closed by the piston portion 16a of the valve needle 16 when the lift of the same is in the second stage throttle range as described above. By thus limiting lift of the valve needle 16 in the second stage throttle range, emission of white smoke is accomplished in the usual manner.

Figure 11:
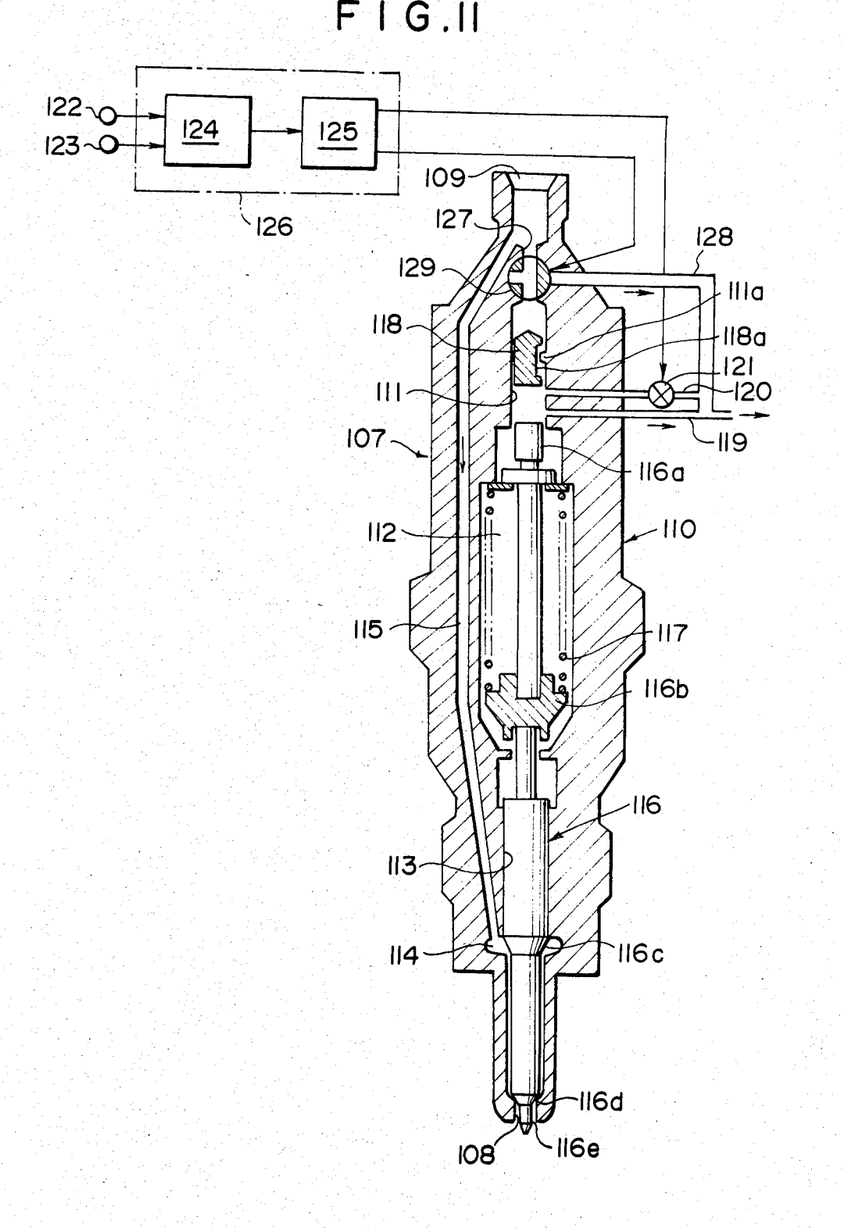
FIG. 11 is an enlarged cross-sectional view of a pintle nozzle employed in the fuel injection system in accordance with a fourth embodiment of the present invention.

FIG. 11 shows the pintle fuel injection nozzle employed in a fourth embodiment of the present invention.

Figure 13:
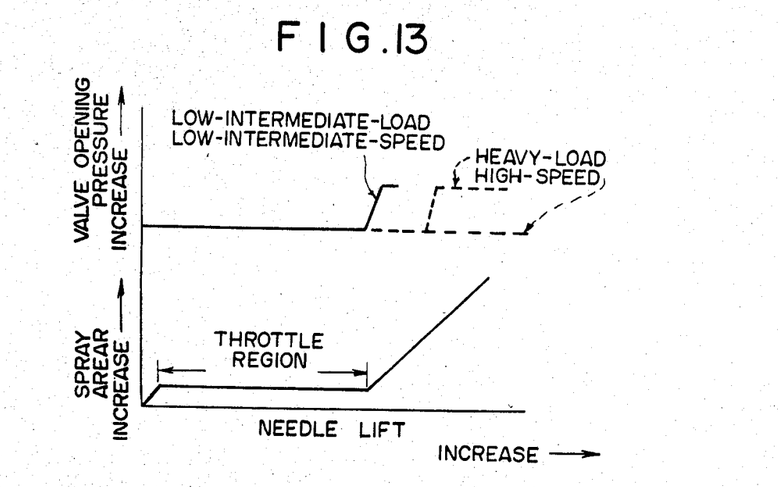
FIG. 13 is a view showing the relations between the valve needle lift and the valve opening pressure, and between the valve needle lift and the spray area in the fuel injection system of the fourth embodiment.

As shown in FIG. 11, the pintle fuel injection nozzle 107 comprises a nozzle body 110 in which a fuel inlet 109, a pressure passage 127, a cylinder 111, a spring chamber 112, a valve needle retaining hole 113, a fuel pressure chamber 114, and a fuel spray hole 108 are coaxially formed in this order from the rear end (the upper end in FIG. 11) to the front end to communicate with each other. The fuel spray hole 108 opens in the combustion chamber and the fuel inlet 109 is connected to a fuel injection pump (not shown). The nozzle body 110 is further provided with a fuel passage 115 by way of which the fuel inlet 109 and the fuel pressure chamber 114 (fuel spray hole 108) directly communicate with each other. In the hollow portion from the cylinder 111 to the fuel spray hole 108 is inserted a valve needle 116 slidably retained by the valve needle retaining hole 113 in the liquid-tight fashion. The valve needle 116 comprises a piston portion 116a inserted into the front end portion of the cylinder 111, a spring retaining portion 116b disposed in the spring chamber 112, a pressure portion 116c which receives the fuel pressure in the fuel pressure chamber 114, a valve portion 116d for opening and closing the spray hole 108 and a throttle portion 116e inserted into the spray hole 108 spaced from the wall surface thereof by a predetermined distance. In the spring chamber 112 is disposed a nozzle spring 117 for urging the valve needle 116 in the valve closure direction. When pressurized fuel from the fuel injection pump is introduced into the fuel pressure chamber 114 through the fuel inlet 109 and the fuel passage 115, the valve needle 116 is opened or lifted overcoming the force of the spring 117 by the pressure imparted to the pressure portion 116c thereof and thereby the pressurized fuel is sprayed into the combustion chamber through the spray hole 108. As the lift of the valve needle 116 increases, the opening area of the spray hole 108 or the effective spray area changes as shown in the lower portion of FIG. 13. That is, at smaller lifts of the valve needle 116 before the throttle portion 116e leaves the spray hole 108, the effective spray area is held substantially constant (the throttle range) and after the throttle portion 116e is moved away from the spray hole 108, the effective spray area is increased in proportion to the lift of the valve needle 116 (the proportional change range), and thereafter the lift of the valve needle 116 reaches maximum.

A plunger member 118 is received in the rear portion of the cylinder 111 for limited sliding movement, with an engaging groove 118a formed in the peripheral surface thereof being engaged with a projection 111a formed on the wall surface defining the cylinder 111. That is, the plunger member 118 is slidably disposed behind the valve needle 116 coaxially therewith, the front end of the plunger member 118 opposed to the piston portion 116a or the rear end portion of the valve needle 116 and the rear end surface of the plunger member 118 being adapted to receive the fuel pressure from the fuel inlet 109 through the pressure passage 127.

First and second drain passages 119 and 120 open in the cylinder 111 between the rear end of the valve needle 116 and the plunger member 118 at positions spaced from each other in the axial direction of the cylinder 111 by a predetermined distance. Through the drain passages 119 and 120, leakage fuel leaking in the cylinder 111 and the spring chamber 112 from the fuel pressure chamber 114 through the fine space between the valve needle 116 and the wall surface defining the valve needle retaining hole 113 is discharged to a fuel reservoir (not shown). The first drain passage 119 is positioned to be closed by the piston portion 116a of the valve needle 116 while the lift of the valve needle 116 is in the throttle range in which the spray area is narrowed by the throttle portion 116c of the valve needle 116. On the other hand, the second drain passage 120 is positioned to be closed by the piston portion 116a of the valve needle 116 when the lift of the valve needle 116 is in the proportional change range in which the effective spray area is increased in proportion to the lift of the valve needle 116.

The second drain passage 120 is provided with a solenoid valve 121 for selectively opening and closing the second drain passage 120. A communicating passage 128 connects an intermediate portion of the pressure passage 127 behind the plunger member 118 with the second drain passage 120 downstream of the solenoid valve 121. A solenoid rotary valve 129 is disposed at the junction between the pressure passage 127 and the communicating passage 128 to selectively open and close the pressure passage 127. When the rotary valve 129 is closed, the pressure passage 127 is closed and at the same time, the portion of the pressure passage 127 on the side of cylinder 111 with respect to the rotary valve 129 (This portion of the pressure passage 127 will be referred to as "cylinder side portion" hereinbelow while the portion of the pressure passage 127 on the other side of the rotary valve 129 will be referred to as "inlet side portion".) is communicated with the communicating passage 128. On the other hand, when the rotary valve 129 is opened, the pressure passage 127 is opened and the communication between the cylinder side portion of the pressure passage 127 and the communicating passage 128 is broken.

A control device 126 for controlling the valves 121 and 129 comprises a valve driving circuit 125 for driving the valves 121 and 129 and a control circuit 124 which receives outputs of an engine speed sensor 122 and an engine load sensor 123 and controls the valve driving circuit 125 according to the operating condition of the engine. That is, at low speed and light load, the solenoid valve 121 is closed and the rotary valve 129 is opened so that the leakage fuel is discharged only through the first drain passage 119 with fuel pressure being imparted to the rear end face of the plunger member 118. A intermediate speed and intermediate load, both the solenoid valve 121 and the rotary valve 129 are opened so that the leakage fuel is discharged through both the first and second drain passages 119 and 120 with fuel pressure being imparted to the rear end face of the plunger member 118. At high speed and heavy load, the solenoid valve 121 is opened and the rotary valve 129 is closed so that the leakage fuel is discharged through both the first and second drain passages 119 and 120 with the fuel pressure imparted to the plunger member 118 being removed.

When pressurized fuel is supplied to the fuel injection nozzle 107, the pressurized fuel is introduced into the fuel pressure chamber 114 through the fuel inlet 109 via the fuel passage 115, and pushes the pressure portion 116c of the valve needle 116 to lift the valve needle 116 against the force of the nozzle spring 117, whereby the fuel is sprayed into the combustion chamber through the spray hole 108.

Figure 12:
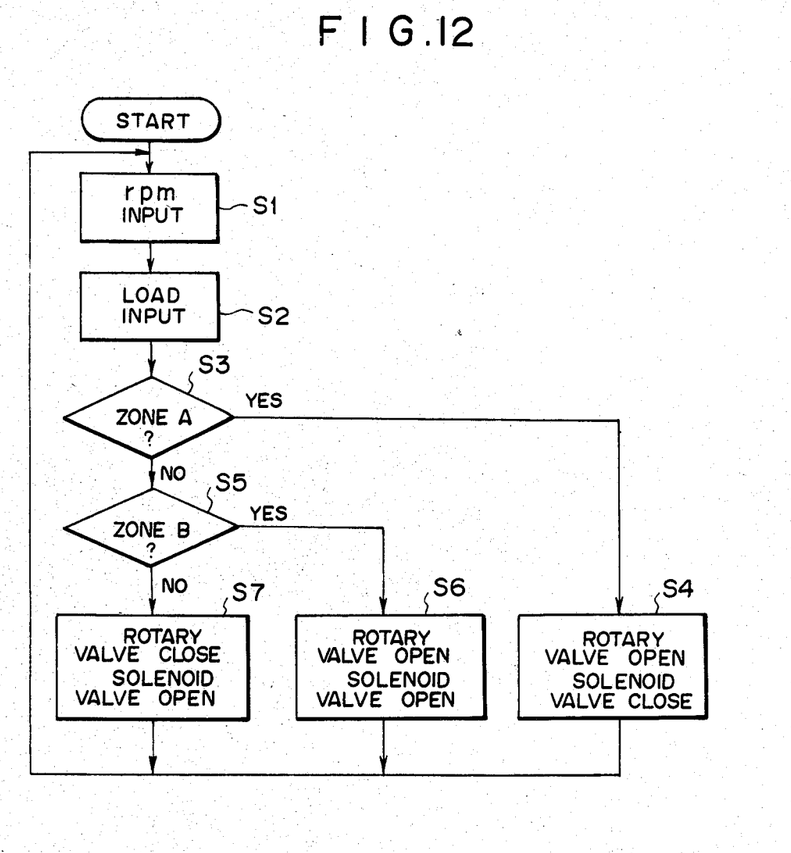
FIG. 12 is a flow chart for illustrating the operation of the control device of the fuel injection system of the fourth embodiment.

The pressure of the pressurized fuel at the fuel inlet 109 acts on the rear end surface of the plunger member 118 in the cylinder 111 to push the plunger member 118 toward the valve needle 116. The fuel pressure acting on the plunger member 118 controls the lift of the valve needle 116. That is, as shown in FIG. 12, the control circuit 124 receives an engine speed signal from the engine speed sensor 122 (step 1) and an engine load signal from the engine load sensor 123 (step 2), and determines whether or not the operating region of the engine is in the low speed light load region corresponding to zone A in FIG. 14 (step 3). When it is determined that the operating region is in the low speed, light load region corresponding to zone A in FIG. 14, the solenoid valve 121 is closed and the rotary valve 129 is opened (step 4), and accordingly the valve needle 116 is lifted by the fuel pressure imparted to the pressure portion 116c thereof overcoming only the force of the nozzle spring 117 with leakage fuel in the cylinder 111 being discharged through the first drain passage 119 until the valve needle 116 is lifted to such an extent that the piston portion 116a of the valve needle 116 closes the first drain passage 119, and after the first drain passage 119 is closed, the leakage fuel is confined in the cylinder 111 between the piston portion 116a of the valve needle 116 and the plunger member 118, whereby the fuel pressure acting on the rear end surface of the plunger member 118 is transmitted to the valve needle 116 to resist lift of the valve needle 116, i.e., the opening pressure of the same is increased. This effect is obtained while the lift of the valve needle 116 is in the throttle range as shown by the solid line in the upper portion of FIG. 13 because the first drain passage 119 is positioned to be closed by the piston portion 116a of the valve needle 116 when the lift of the same is in the throttle range as described above. By thus limiting lift of the valve needle 116 to within the throttle range, the condition in which fuel is injected from the spray hole 108 at high velocity is maintained for a long time, thereby promoting atomization of the fuel to improve combustion and emission.

Figure 14:
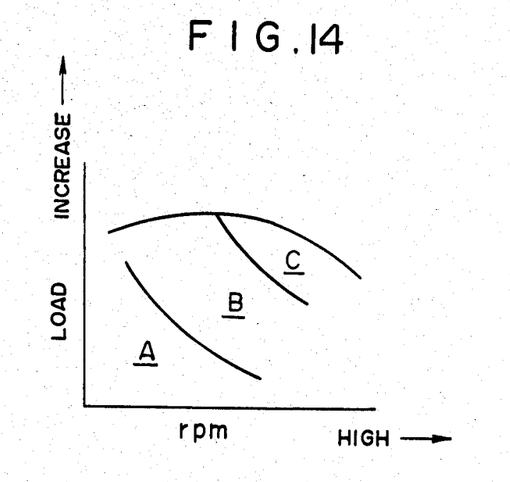
FIG. 14 is a view showing the operating regions of the engine based on which the fuel injection system of the fourth embodiment is controlled.

On the other hand, when it is not determined in the step 3 that the operating region is in the low speed light load region corresponding to zone A in FIG. 14, it is determined whether or not the operating condition of the engine is in the intermediate speed intermediate load region corresponding to zone B in FIG. 14 (step 5). When it is determined that the operating condition of the engine is in the intermediate speed intermediate load region in step 4, both the solenoid valve 121 and the rotary valve 129 are opened (step 6). In this case, the valve needle 116 is lifted discharging the leakage fuel in the cylinder 111 through both the first and second drain passages 119 and 120 until the piston portion 116a thereof closes the first drain passage 119, and thereafter the valve needle 116 is lifted discharging the leakage fuel through only the second drain passage 120. Because the second drain passage 120 is positioned to be closed when the valve needle 116 is lifted to the proportional change range between the throttle range and the maximum lift as described above, the valve opening pressure is increased, by the fuel pressure on the plunger member 118, in the proportional change range as shown by the dotted line in the upper part of FIG. 13 whereby a sufficient amount of fuel can be sprayed into the combustion chamber and the engine output torque can be improved.

When it is not determined that the operating condition of the engine is in the intermediate speed, intermediate load region in the step 5, i.e., it is determined that the operating condition of the engine is in the high speed, heavy load region corresponding to the zone C in FIG. 14, the solenoid valve 121 is opened and the rotary valve 129 is closed. In this case, because fuel pressure is not imparted to the plunger member 118, the valve needle 116 is lifted to the maximum without being resisted by the plunger member 118 as shown by the dashed line in the upper part of FIG. 13 as in conventional pintle type fuel injection nozzles, whereby a sufficient amount of fuel can be sprayed into the combustion chamber and the engine output power can be improved.

Figure 15:
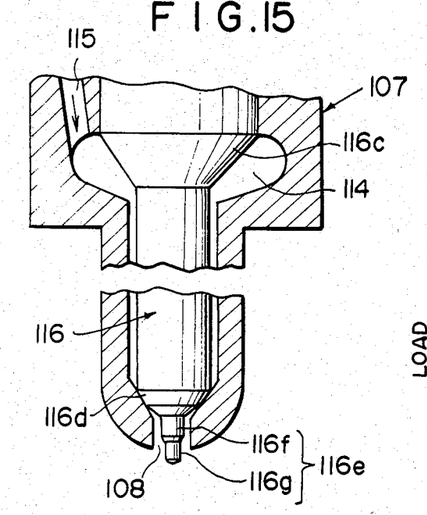
FIG. 15 is a fragmentary cross-sectional view of a pintle nozzle employed in a fuel injection system in accordance with a fifth embodiment of the present invention.
Figure 16:
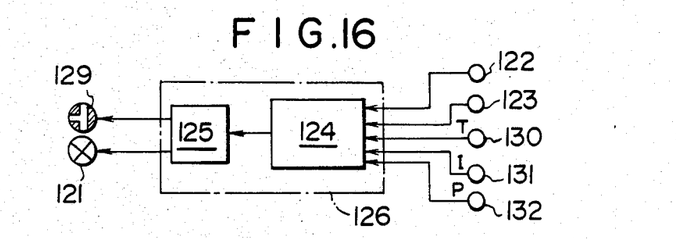
FIG. 16 is a schematic view of a control device of the fuel injection system of the fifth embodiment.

FIGS. 15 and 16 respectively show a part of the fuel injection nozzle and the control device employed in a fuel injection system in accordance with a fifth embodiment of the present invention. The fuel injection system of this embodiment is basically the same as that of the fourth embodiment except that the control of the valves 121 and 129 differs from that in the fourth embodiment. In this embodiment, the solenoid valve 121 and the rotary valve 129 are controlled according to the engine coolant temperature T, the ambient temperature t and the atmospheric pressure P in addition to the engine speed and the engine load. That is, the control circuit 124 of the control device 126 in this embodiment receives outputs of a coolant temperature sensor 130, an ambient temperature sensor 131 and an atmospheric pressure sensor 132 in addition to the outputs of the engine speed sensor 122 and the engine load sensor 123, as shown in FIG. 16.

Figure 18:
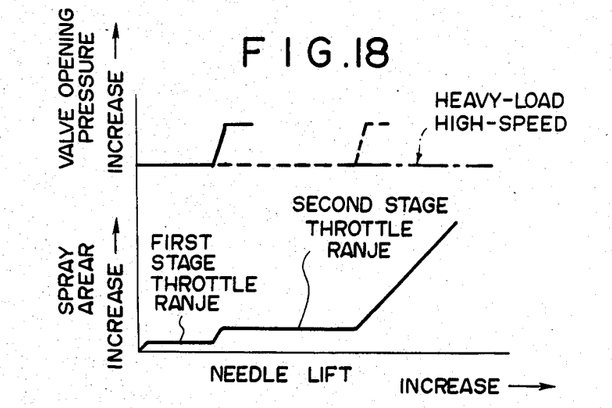
FIG. 18 is a view showing the relations between the valve needle lift and the valve opening pressure, and between the valve needle lift and the spray area in the fuel injection system of the fifth embodiment.

Further, in this embodiment, the throttle portion 116e of the valve needle 116 comprises a larger diameter throttle portion 116f and a smaller diameter throttle portion 116g which is nearer to the tip of the valve needle 116 than the larger diameter throttle portion 116f. Therefore, in the this embodiment, as the lift of the valve needle 116 is increased, the opening area of the spray hole 108 or the effective spray area changes as shown in the lower portion of FIG. 18. That is, before the larger diameter throttle portion 116f is retracted from the spray hole 108, the effective spray area is defined by the larger diameter throttle portion 116f and is extremely small. The effective spray area is held constant at the extremely small area (referred to as "first stage throttle range") until the larger diameter throttle portion 116f is retracted from the spray hole 108. After the larger diameter throttle portion 116f is retracted from the spray hole 108, the effective spray area is defined by the smaller diameter throttle portion 116g and accordingly is somewhat widened (referred to as "second stage throttle range"). After the larger diameter throttle portion 116f is retracted from the spray hole 108 and before the smaller diameter throttle portion 116g is retracted from the spray hole 108, the effective spray area is held constant at the somewhat widened area. After the smaller diameter throttle portion 116g is retracted away from the spray hole 108, the effective spray area is increased in proportion to the lift of the valve needle 116 (referred to as "proportional change range") and thereafter the lift of the valve needle 116 reaches maximum. In this embodiment, the first drain passage 119 is positioned to be closed by the piston portion 116a when the lift of the valve needle 116 is in the first stage throttle range, and the second drain passage 120 is positioned to be closed by the piston portion 116a when the lift of the valve needle 116 is in the second stage throttle range.

Figure 17:
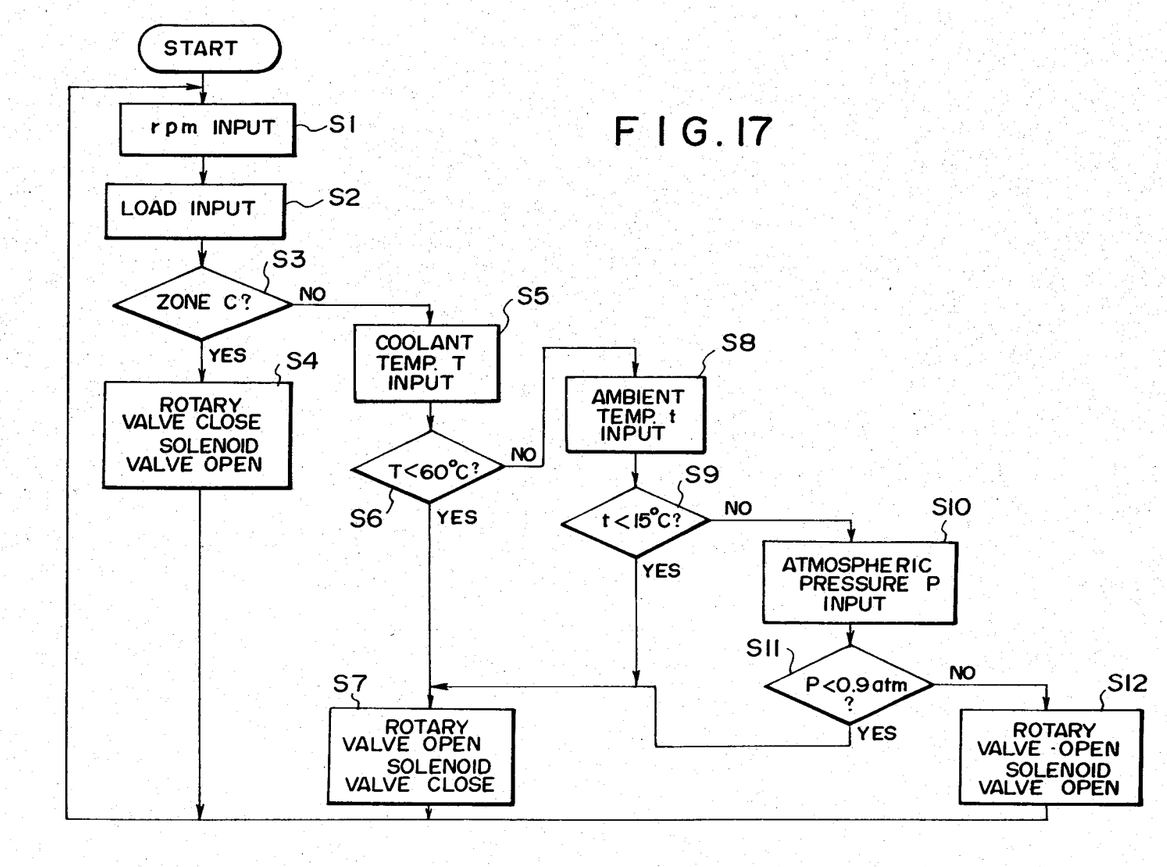
FIG. 17 is a flow chart for illustrating the operation of the control device of the fuel injection system of the fifth embodiment.

Now operation of the control circuit 124 in the fifth embodiment will be described with reference to FIG. 17.

Figure 19:
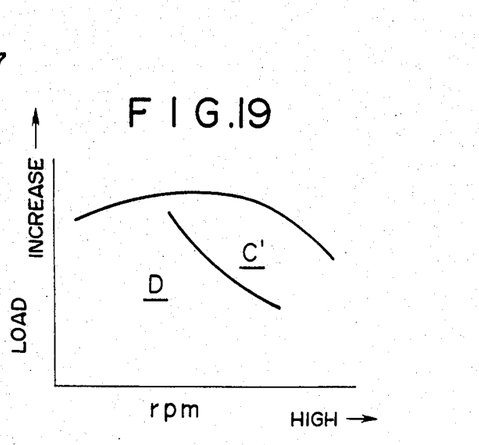
FIG. 19 is a view showing the operating regions of the engine based on which the fuel injection system of the fifth embodiment is controlled.

The control circuit 124 receives an engine speed signal from the engine speed sensor 122 (step 1) and an engine load signal from the engine load sensor 123 (step 2), and determines whether or not the operating region of the engine is in the high speed, heavy load region corresponding to zone C' in FIG. 19 (step 3). When it is determined that the operating region is in the high speed, heavy load region corresponding to the zone C' in FIG. 19, the solenoid valve 121 is opened and the rotary valve 129 is closed (step 4). In this case, the valve needle 116 is lifted without interference from the plunger member 118 as shown by the dashed line in the upper portion of FIG. 18 as can be understood from the description in conjunction with the fourth embodiment.

When it is not determined that the operating region is in the high speed, heavy load region, i.e., when it is determined that the operating region is in the low-to-intermediate speed, light-to-intermediate load region corresponding to the zone D in FIG. 19, the coolant temperature signal is input from the coolant temperature sensor 130 to the control circuit 124 (step 5), and it is determined whether or not the engine coolant temperature T is lower than 60° C. (step 6). When it is determined that the engine coolant temperature T is not lower than 60 ° C., the ambient temperature signal is input from the ambient temperature sensor 131 (step 8) and then it is determined whether or not the ambient temperature t is lower than 15° C. in step 9. When it is determined that the ambient temperature t is not lower than 15° C., the atmospheric pressure signal is input from the atmospheric temperature sensor 132 in step 10. Then it is determined whether or not the atmospheric pressure P is lower than 0.9 atm in step 11.

When it is determined that the atmospheric pressure P is higher than 0.9 atm in step 11, i.e., when the engine coolant temperature T is higher than 60° C., the ambient temperature is higher than 15° C. and the atmospheric pressure is higher than 0.9 atm, both the solenoid valve 121 and the rotary valve 129 are opened, and accordingly the valve needle 116 is lifted by the fuel pressure imparted to the pressure portion 16c thereof overcoming only the force of the nozzle spring 117 and discharging the leakage fuel in the cylinder through both the first and second drain passages 119 and 120 until the valve needle 116 is lifted to such an extent that the piston portion 116a closes the second drain passage 120. After the second drain passage 120 is closed, the leakage fuel is confined in the cylinder 111 between the piston portion 116a of the valve needle 116 and the plunger member 118, whereby the fuel pressure acting on the rear surface of the plunger member 118 is transmitted to the valve needle 116 to resist lift of the valve needle 116, i.e., the opening pressure of the same is increased. This effect is obtained while the lift of the valve needle 116 is in the second stage throttle range as shown by the dotted line in the upper portion of FIG. 18 because the second drain passage is positioned to be closed by the piston portion 116a of the valve needle 116 when the lift of the same is in the second stage throttle range as described above. By thus limiting lift of the valve needle 116 in the second stage throttle range, emission of white smoke is accomplished in the usual manner.

When it is determined that the engine coolant temperature T is not higher than 60° C. (step 6), or the ambient temperature t is not higher than 15° C., or the atmospheric pressure P is not higher than 0.9 atm, that is, when the engine is apt to emit white smoke, the solenoid valve 121 is closed and the rotary valve 129 is opened. In this case, the valve needle 116 is lifted by the fuel pressure imparted to the pressure portion 116c thereof overcoming only the force of the nozzle spring 117 with leakage fuel in the cylinder 111 being discharged through the first drain passage 119 until the valve needle 116 is lifted to such an extent that the piston portion 116a of the valve needle 116 closes the first drain passage 119, and after the first drain passage 119 is closed, the leakage fuel is confined in the cylinder 111 between the piston portion 116a of the valve needle 116 and the plunger member 118, whereby the fuel pressure acting on the rear surface of the plunger member 118 is transmitted to the valve needle 116 to resist lift of the valve needle 116, i.e., the opening pressure of the same is increased. This effect is obtained while the lift of the valve needle 116 is in the first stage throttle range as shown by the solid line in the upper portion of FIG. 18 because the first drain passage 119 is positioned to be closed by the piston portion 116a of the valve needle 116 when the lift of the same is in the first stage throttle range as described above. By thus limiting lift of the valve needle 116 to within the first stage throttle range, the condition in which fuel is injected from the spray hole 108 at high velocity is maintained for a long time, thereby promoting atomization of the fuel to improve combustion and emission. Thus, emission unburned fuel or white smoke due to HC can be reduced.

Though in the above embodiment, the present invention is applied to a direct injection type diesel engine, the present invention can be applied to diesel engines of other types, e.g., to a swirl chamber type diesel engine.

We claim:

1. In a fuel injection system for a diesel engine comprising a pintle type fuel injection nozzle and fuel supply means for feeding pressurized fuel to the fuel injection nozzle, the fuel injection nozzle having a valve needle slidable back and forth in the axial direction thereof between a valve closure position in which a front end portion thereof is inserted into a spray hole and a maximum lift position in which the distance between the front end portion and the spray hole is maximum, and a central plunger member which is slidable in the axial direction of the valve needle and provided with a front end face, opposed to a rear end face of the valve needle, and a rear end face adapted to receive the pressure of the pressurized fuel fed to the fuel injection nozzle from the fuel supply means, the valve needle being adapted to be lifted by a predetermined fuel pressure to a pre-lift position where the rear end face of the valve needle abuts against the front end face of the plunger member so that further lift of the valve needle is resisted by the fuel pressure acting on the rear end face of the plunger member, thereby changing the valve opening pressure stepwise with change in the amount of lift of the valve needle, the improvement which comprises pre-lift change means for changing the amount of the pre-lift of the valve needle and including a plurality of fuel drain passages provided in a wall of a cylindrical space formed in a valve body and being spaced from each other in the direction of movement of the valve needle, said valve needle and said centeral plunger member being slidably received in a cylindrical space formed in a valve body, and switching valve means for selectively opening and closing the fuel drain passage under the control of the control means, each fuel drain passage being adapted to discharge leakage fuel between the valve needle and said central plunger member.

2. In a fuel injection system for a diesel engine comprising a pintle type fuel injection nozzle and fuel supply means for feeding pressurized fuel to the fuel injection nozzle, the fuel injection nozzle having a valve needle slidable back and forth in the axial direction thereof between a valve closure position in which a front end portion thereof is inserted into a spray hole and a maximum lift position in which the distance between the front end portion and the spray hole is maximum, and a central plunger member which is slidable in the axial direction of the valve needle and provided with a front end face, opposed to a rear end face of the valve needle, and a rear end face adapted to receive the pressure of the pressurized fuel fed to the fuel injection nozzle from the fuel supply means, the valve needle being adapted to be lifted by a predetermined fuel pressure to a pre-lift position where the rear end face of the valve needle abuts against the front end face of the plunger member so that further lift of the valve needle is resisted by the fuel pressure acting on the rear end face of the plunger member, thereby changing the valve opening pressure stepwise with change in the amount of lift of the valve needle, the improvement which comprises that the central plunger member is disposed within a cylindrical space formed in a valve body extending along the axial direction, the rear end of the valve needle being adapted to be inserted in the cylindrical space, pre-lift change means for changing the distance between the rear end of the valve needle and the front end of the central plunger member to a predetermined amount, said pre-lift change means including a fuel drain passage which opens into the cylindrical space between the rear end of the valve needle and the front end of the central plunger member and being provided with means for changing an effective position of the fuel drain passage along the axial direction of the cylindrical space, an operating condition detecting means for detecting the operating condition of the engine, a control means for controlling the pre-lift change means according to the output of the operating condition detecting means so that the amount of pre-lift of the valve needle is reduced as speed or load of the engine decreases and is increased as speed or load of the engine increases.

3. In a fuel injection system for a diesel engine comprising a pintle type fuel injection nozzle and fuel supply means for feeding pressurized fuel to the fuel injection nozzle, the fuel injection nozzle having a valve needle slidable back and forth in the axial direction thereof between a valve closure position in which a front end portion thereof is inserted into a spray hole and a maximum lift position in which the distance between the front end portion and the spray hole is maximum, said valve needle including a columnar portion with a substantially constant diameter and a conical portion disposed in front of the columnar portion, the position of the valve needle being adapted to change, as the amount of lift of the valve needle increases, among a throttle range where an effective spray area defined by the valve needle and the spray hole is substantially constant, an expansion range where the effective spray area gradually increases, and a full-lift range where the valve needle is retracted from the spray hole, and a central plunger member which is slidable in the axial direction of the valve needle and provided with a front and face, opposed to a rear end face of the valve needle, and a rear end face adapted to receive the pressure of the pressurized fuel fed to the fuel injection nozzle from the fuel supply means, the valve needle being adapted to be lifted by a predetermined fuel pressure to a pre-lift position where the rear end face of the valve needle abuts against the front end face of the plunger member so that further lift of the valve needle is resisted by the fuel pressure acting on the rear end face of the plunger member, thereby changing the valve opening pressure stepwise with change in the amount of lift of the valve needle,     the improvement which commprises pre-lift change means for changing the amount of the pre-lift of the valve needle to at least two positions of the fuel injection nozzle selected from the group of throttle range, full-lift range, and expansion range between the throttle and full-lift range; and operating condition detecting means for detecting the operating condition of the engine; and a control means for controlling the pre-lift change means according to the output of the operating condition detecting means so that the amount of pre-lift is reduced when the engine operates at low speed or under light load and is increased when the engine operates at high speed or under heavy load, the effective spray area at a fixed fuel pressure at the time of pre-lift being increased as speed or load of the engine increases.

4. In a fuel injection system for a diesel engine comprising a pintle type fuel injection nozzle and fuel supply means for feeding pressurized fuel to the fuel injection nozzle, the fuel injection nozzle having a valve needle slidable back and forth in the axial direction thereof between a valve closure position in which a front end portion thereof is inserted into a spray hole and a maximum lift position in which the distance between the front end portion and the spray hole is maximum, and a central plunger member which is slidable in the axial direction of the valve needle and provided with a front end face, opposed to a rear end face of the valve needle, and a rear end face adapted to receive the pressure of the pressurized fuel fed to the fuel injection nozzle from the fuel supply means, the valve needle being adapted to be lifted by a predetermined fuel pressure to a pre-lift position where the rear end face of the valve needle abuts against the front end face of the plunger member so that further lift of the valve needle is resisted by the fuel pressure acting on the rear end face of the plunger member, thereby changing the valve opening pressure stepwise with change in the amount of lift of the valve needle,     the improvement which comprises that the fuel injection nozzle has a first stage throttle range with a small effective spray area, a second stage throttle range with an effective spray area longer than that of the first stage throttle range, an expansion range with gradually increasing effective spray area, and a full-throttle range corresponding to the lift of the valve needle; pre-lift change means for changing the amount of the pre-lift of the valve needle to a position in the first stage throttle range when the engine coolant temperature is lower than a predetermined value and to a position in the second stage throttle range when the engine coolant temperature is higher than the predetermined value; an operating condition detecting means for detecting the operating condition of the engine; and a control means for controlling the pre-lift change means according to the output of the operating condition detecting means.

5. In a fuel injection system for a diesel engine comprising a pintle type fuel injection nozzle and fuel supply means for feeding pressurized fuel to the fuel injection nozzle, the fuel injection nozzle having a valve needle slidable back and forth in the axial direction thereof between a valve closure position in which a front end portion thereof is inserted into a spray hole and a maximum lift position in which the distance between the front end portion and the spray hole is maximum, and a central plunger menber which is slidable in the axial direction of the valve needle and provided with a front end face, opposed to a rear end face of the valve needle, and a rear end face adapted to receive the pressure of the pressurized fuel fed to the fuel injection nozzle from the fuel supply means, the valve needle being adapted to be lifted by a predetermined fuel pressure to a pre-lift position where the rear end face of the valve needle abuts against the front end face of the plunger member so that further lift of the valve needle is resisted by the fuel pressure acting on the rear end face of the plunger member, thereby changing the valve opening pressure stepwise with change in the amount of lift of the valve needle,     the improvement which comprises that the fuel injection nozzle has a first stage throttle range with a small effective spray area, a second stage throttle range with an effective spray area longer than that of the first stage throttle range, an expansion range with gradually increasing effective spray area, and a full-throttle range corresponding to the lift of the valve needle; pre-lift change means for changing the amount of the pre-lift of the valve needle to a position in the first stage throttle range when the atmospheric pressure is lower than a predetermined value and to a position in the second stage throttle range when the atmospheric pressure is higher than the predetermined value; an operating condition detecting means for detecting the operating condition of the engine; and a control means for controlling the pre-lift change means according to the output of the operating condition detecting means.

6. A fuel injection system as defined in claim 1 in which said pre-lift change means changes the pre-lift position to a first pre-lift position when the engine operates at light load and to a second pre-lift position when the engine operates at heavy load, the amount of pre-lift being larger in the second pre-lift position than in the first pre-lift position.

7. A fuel injection system as defined in claim 6 in which the first pre-lift position of the valve needle is in the throttle range in which the front end portion is in the spray hole to throttle the area thereof, and the second pre-lift position is between the throttle range and the maximum lift position.

8. A fuel injection system as defined in claim 6 in which the pre-lift position is changed to the second pre-lift position when the engine operates at high speed and heavy load.

9. A fuel injection system as defined in claim 8 in which the first pre-lift position is in the throttle range in which the front end portion of the valve needle is in the spray hole to throttle the area thereof, and the second pre-lift position is above the maximum lift position.

10. A fuel injection system as defined in claim 1 in which said pre-lift change means changes the pre-lift position to increase the amount of pre-lift when the engine operates at high speed.

11. A fuel injection system as defined in claim 1 in which said valve needle and the spray hole are arranged with respect to each other so that the effective opening area of the spray hole is changed in first and second stage throttle ranges as the valve needle is lifted with the front end portion in the spray hole, the effective opening area of the spray hole being larger in the second stage throttle range than in the first stage throttle range, and said pre-lift change means changes the pre-lift position to a first pre-lift position in the first stage throttle range or to a second pre-lift position in the second stage throttle range according to the operating condition of the engine.

12. A fuel injection system as defined in claim 11 in which said pre-lift position is changed to the first pre-lift position when the engine coolant temperature is lower than a predetermined temperature or when the ambient temperature is lower than another predetermined temperature.

13. A fuel injection system as defined in claim 11 in which said pre-lift position is changed to the first pre-lift position when the atmospheric pressure is lower than a predetermined value.

14. A fuel injection system as defined in claim 1 in which a valve is provided in the fuel pressure passage through which said fuel pressure is imparted to the rear end face of the plunger member.

15. A fuel injection system as defined in claim 14 in which said switching valve means is controlled to selectively open and close the fuel drain passages so that the pre-lift position is changed to a first pre-lift position to reduce the amount of pre-lift when the engine operates at low speed light load, and when the engine operates at high speed heavy load, said valve in the fuel pressure passage is closed.

16. A fuel injection system as defined in claim 15 in which said pre-lift position is changed to the first pre-lift position or a second pre-lift position, the amount of pre-lift being larger in the second pre-lift position than in the first pre-lift position, the first pre-lift position being in the throttle range, and the second pre-lift position being between the throttle range and the maximum lift position.

17. A fuel injection system as defined in claim 14 in which said valve needle and the spray hole are arranged with respect to each other so that the effective opening area of the spray hole is changed in first and second stage throttle ranges as the valve needle is lifted with the front end portion in the spray hole, the effective area of the spray hole being larger in the second stage throttle range than in the first stage throttle range, and said pre-lift change means changes the pre-lift position to a first pre-lift position in the first stage throttle range when one of the engine coolant temperature, the ambient temperature and the atmospheric pressure is smaller than a predetermined value and to a second pre-lift position in the second stage throttle range when the engine speed and/or the engine load is lower than a predetermined value.

18. A fuel injection system as defined in claim 2 in which said pre-lift change means changes the pre-lift position to a position in the full-lift range when the engine operates at high speed under heavy load.

* * * * *